(12) United States Patent
Rieger et al.

(10) Patent No.: US 7,930,874 B2
(45) Date of Patent: Apr. 26, 2011

(54) CHAIN MEMBER ASSEMBLY FOR A TIRE CHAIN AND CHAIN MEMBER FOR USE IN SUCH A CHAIN MEMBER ASSEMBLY

(75) Inventors: Johannes Werner Rieger, Oberkochen (DE); Zvonimir Bogdan, Abtsgmünd (DE)

(73) Assignee: Erlau AG, Aalen (DE)

( * ) Notice: Subject to any disclaimer, the term of this patent is extended or adjusted under 35 U.S.C. 154(b) by 216 days.

(21) Appl. No.: 12/203,988

(22) Filed: Sep. 4, 2008

(65) Prior Publication Data
US 2009/0056301 A1 Mar. 5, 2009

(30) Foreign Application Priority Data
Sep. 4, 2007 (DE) .................... 10 2007 043 744

(51) Int. Cl.
  *B60C 27/20* (2006.01)
(52) U.S. Cl. ............. 59/78; 59/93; 152/243; 152/231
(58) Field of Classification Search ............ 59/78, 80, 59/93; 152/217, 219, 222, 231, 243, 244
See application file for complete search history.

(56) References Cited

U.S. PATENT DOCUMENTS

| 2,650,470 | A | * | 9/1953 | Sennholtz | 59/90 |
| 3,714,975 | A | * | 2/1973 | Muller | 152/243 |
| 3,799,232 | A | | 3/1974 | Schnurle et al. | |
| 4,497,169 | A | * | 2/1985 | Millington | 59/84 |
| 4,627,232 | A | * | 12/1986 | Bruce | 59/84 |
| 4,928,740 | A | * | 5/1990 | Konig | 152/243 |
| 5,072,763 | A | | 12/1991 | Muller | |
| 6,871,486 | B2 | * | 3/2005 | Moehnke et al. | 59/78 |
| 6,895,739 | B2 | * | 5/2005 | Dudley et al. | 59/78 |
| 6,925,794 | B2 | * | 8/2005 | Dalferth et al. | 59/78 |
| 7,107,754 | B2 | * | 9/2006 | Sinz et al. | 59/78 |
| 7,231,759 | B2 | * | 6/2007 | Benecke | 59/78 |
| 7,299,842 | B2 | * | 11/2007 | Rieger et al. | 152/243 |
| 7,389,634 | B1 | * | 6/2008 | Van Niekerk | 59/78 |
| 2005/0211356 | A1 | | 9/2005 | Rieger et al. | |

FOREIGN PATENT DOCUMENTS

| DE | 1993827 U | 9/1968 |
| EP | 0255506 A | 2/1988 |
| EP | 0425986 A | 5/1991 |
| EP | 0625438 A | 11/1994 |

* cited by examiner

*Primary Examiner* — David B Jones
(74) *Attorney, Agent, or Firm* — Gudrun E. Huckett

(57) ABSTRACT

A chain member assembly for a tire chain has a link having at least one receiving opening delimited by a wall and a ring member engaging the receiving opening. The wall of the receiving opening has at least in the contact area with the ring member at least two contact surfaces spaced apart from one another and a recessed wall section positioned between the at least two contact surfaces. The ring member has an inner side that rests areally against the at least two contact surfaces.

18 Claims, 3 Drawing Sheets

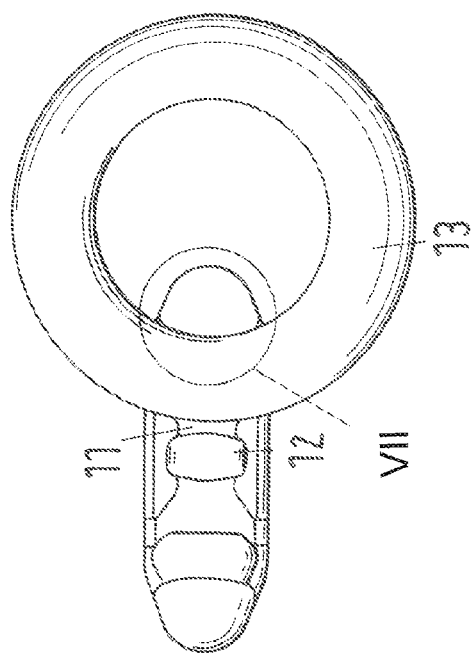
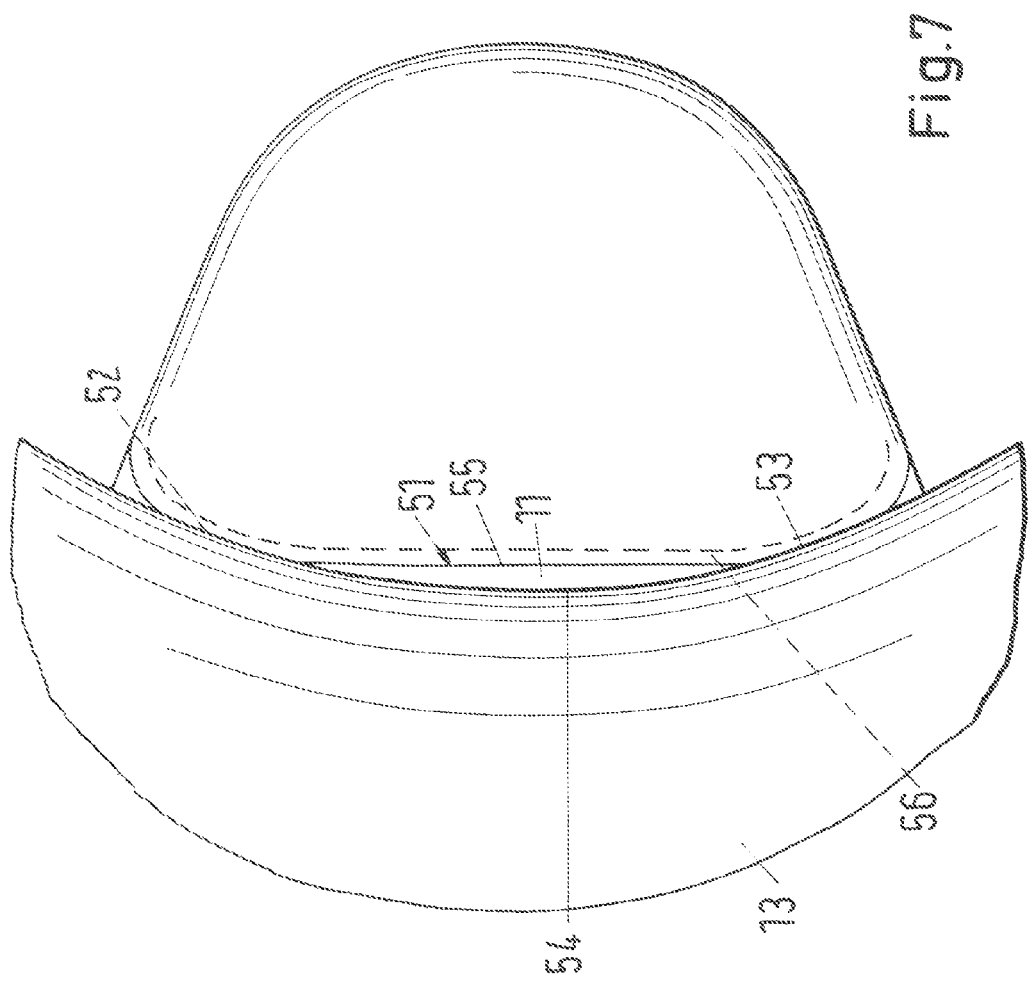

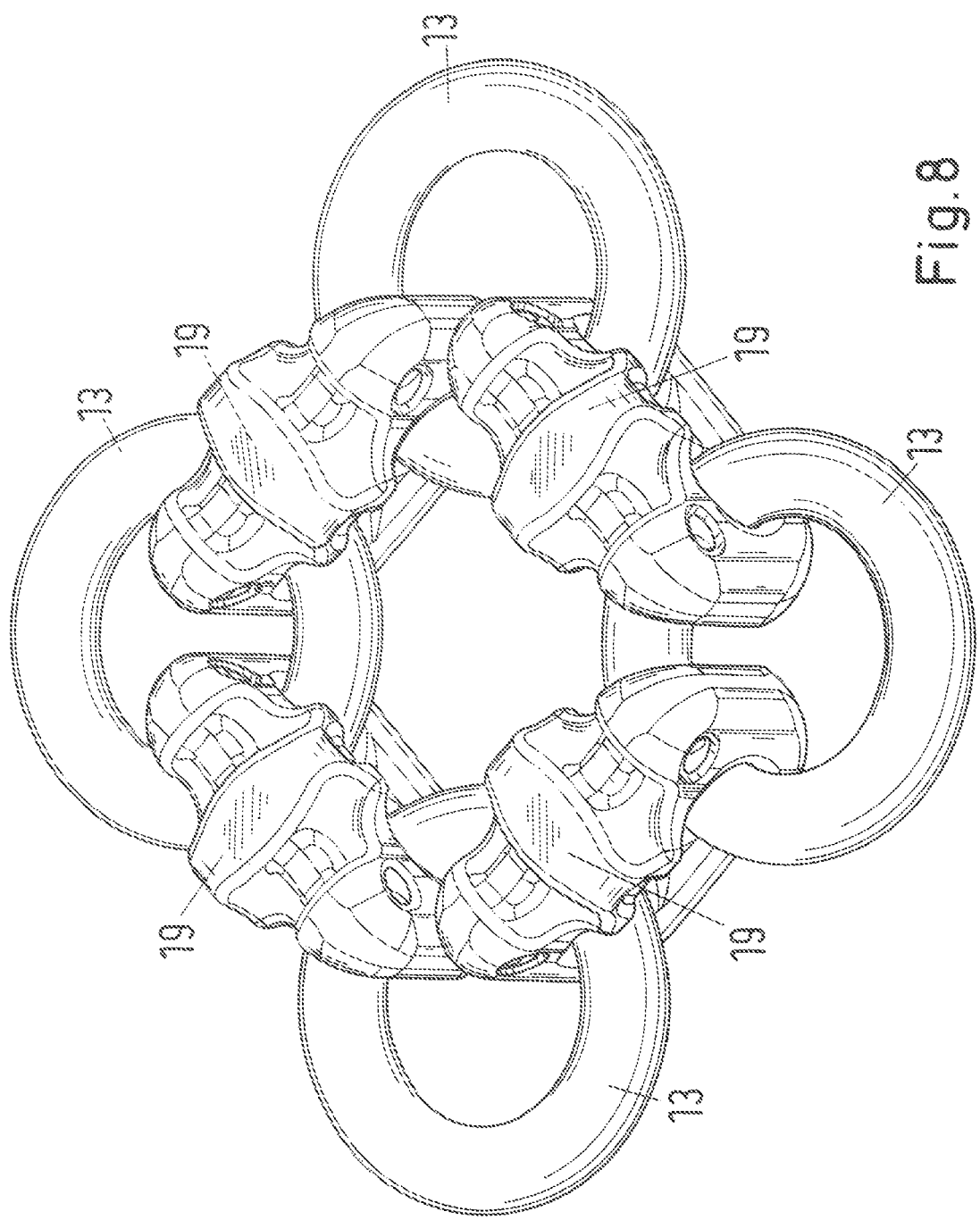

CHAIN MEMBER ASSEMBLY FOR A TIRE CHAIN AND CHAIN MEMBER FOR USE IN SUCH A CHAIN MEMBER ASSEMBLY

BACKGROUND OF THE INVENTION

The invention relates to a chain member assembly for a tire chain that comprises a chain member in the form of link having at least one receiving opening that is delimited by a wall and in which a ring member is received.

The invention further relates to a chain member in the form of a link for use in such a chain member assembly. Such a link comprises a wear part provided at its wear face with terminal wear stays and a central wear stay wherein the wear stays are separated from one another by recesses in the wear face.

Tire chains, in particular protective tire chains, are usually comprised of chain members in the form of links and ring members linked with each other. Particularly under extreme conditions of use, for example, in underground mining operations, the chain members of the tire chain are subjected to high stress and high wear. The wear of the chain members not only occurs in the area where the wear faces of the links contact the ground but also in the engagement areas between the ring members and the links. Moreover, the ring members of known tire chains are subjected to enormous bending loads as the tire rolls across them. Since the links are relatively narrow, there is the risk that they tilt and therefore subject the linked ring members to a high bending force that may cause them to break.

SUMMARY OF THE INVENTION

It is an object of the present invention to configure a chain member assembly of the aforementioned kind and a link of the aforementioned kind in such a way that an extended service life is ensured.

In accordance with the present invention, this is achieved in connection with the chain member assembly in that the wall of the receiving opening has at least two contact surfaces, at least in the contact area with the ring member; the at least two contact areas are spaced apart from one another at a distance and an inner side of the ring member rests areally against the at least two contact surfaces. Between the at least two contact surfaces there is a recessed wall section.

In accordance with the present invention the object is solved in connection with the link in that in at least one of the recesses a longitudinal stay is provided that extends in the longitudinal direction of the link. A further aspect of the link is that the central wear stay projects past the lateral surfaces of the link in order to provide an enlarged contact width.

In the chain member assembly according to the invention the ring member and the link contact one another only by means of the two contact surfaces of the wall of the receiving opening which contact surfaces are positioned at a distance from one another. By this two-surface support action an optimal stabilization and in particular a minimal surface pressure between the ring member and the link are produced. In this way, the wear behavior can be optimized. With increasing time of use of the chain member assembly, the recessed wall section of the link also contacts the inner side of the circular cross-section of the ring member. In this way, the hardened zone in the wall area of the receiving opening of the link can be used over an extended period of time. The chain member assembly is thus distinguished by an extended service life.

The link according to the invention is provided with a longitudinal stay in the recesses between the wear stays which longitudinal stay extends in the longitudinal direction of the link and in use of the chain member assembly provides a stable running behavior. Within the protective tire chain an excellent running stability is thus provided. By means of the longitudinal stay(s) additional hardened edges are provided also.

Advantageously, the width and/or height of the longitudinal stay is smaller than the width of the recess or the height of the wear stays. In this way, when the link according to the invention is in use, first only the wear stays will contact the ground. With increasing period of use, the wear stays wear off so that also the longitudinal stays in the recesses will contact the ground. Since their width is smaller than the width of the recesses, additional edges result that come into contact with the ground and therefore improve the grip of the links.

Advantageously, the longitudinal stay in the recesses has a rectangular cross-section. The edges that are formed between the lateral surfaces of the stay increase the grip of the link and stabilize its running behavior.

The link according to another aspect of the invention is characterized in that the central wear stay projects past the lateral surfaces of the link for forming an enlarged contact width. With this enlarged contact width the link according to the invention is also excellently supported with respect to tilting so that the risk of too high a bending load acting on the ring member coupled to the link is reduced.

Advantageously, in the outer sides of at least one of the wear stays, preferably of all wear stays, a recess is provided. When the wear part of the link according to the invention has been worn off to such an extent that the active wear face has reached the area of these recesses, in these areas new edges are formed that increase again the grip of the link. In this way, even for an extended period of use of the link according to the invention it is ensured that grip and directional stability of the link are always excellent.

The chain member assembly according to the invention as well as the link according to the invention are excellently suitable for protective tire chains in particular tire chains that are used in underground mining operations.

BRIEF DESCRIPTION OF THE DRAWING

FIG. 6 shows the chain member assembly comprised of a link according to the invention and a ring member engaging the link.
FIG. 7 shows the detail VII of FIG. 6.
FIG. 8 is a perspective illustration of part of a tire chain with the links according to the invention that are connected to one another by a ring member, respectively.

DESCRIPTION OF THE PREFERRED EMBODIMENTS

Figure 4:
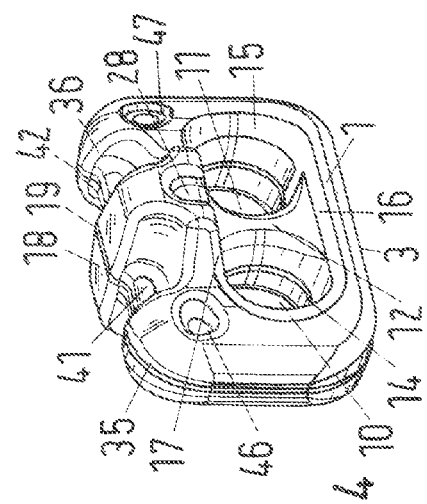
FIG. 4 is a perspective illustration of a link according to FIG. 1.

The link according to FIG. 1 through FIG. 5 has a tire contact part 1 and a wear part 2. The tire contact part 1 has a contact surface 3 with which the link rests against the tire surface when the tire chain is mounted on the tire. The tire contact surface 3 is shaped like a pitched roof (FIG. 3) and therefore has two surface sections 4 and 5 that are positioned at an obtuse angle relative to one another and that converge in the direction toward the tire. The surface sections 4, 5 each pass with a continuous curvature into the lateral surfaces 6, 7 of the link. Approximately at half their height, the lateral surfaces 6, 7 are provided with a recessed portion 8, 9 that is convexly curved. At the level of these recessed portions 8, 9 there are two receiving openings 10, 11 that are separated from one another by a divider stay 12. In the chain member assembly, ring members 13 pass through the receiving openings 10, 11 (FIGS. 6 and 8).

Figure 1:
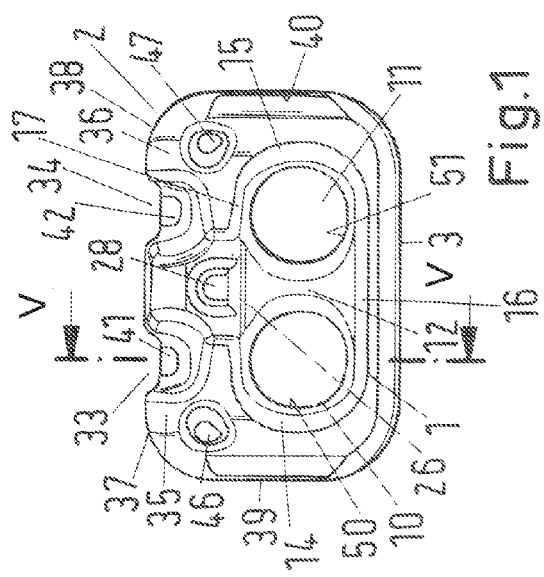
FIG. 1 is a side view of the link according to the invention.

The recessed portions 8, 9, as shown in an exemplary fashion for the recessed portion 9 in FIGS. 1 and 4, have approximately a rectangular contour with rounded narrow ends 14, 15. The narrow ends 14, 15 pass with a continuous curvature into the longitudinal sides 16, 17 of the recessed portions 8, 9. The longitudinal side 16 neighboring the tire contact surface 3 passes with a curved portion into the receiving openings 10, 11 and into the divider stay 12.

Figure 3:
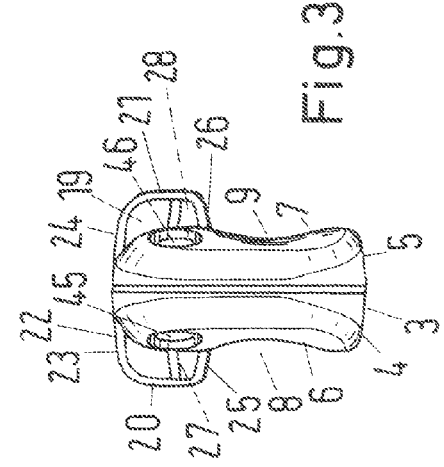
FIG. 3 is an end view of the link according to FIG. 1.

The wear part 2 as a greater width than the tire contact part 1 so that a correspondingly larger wear volume is available and accordingly the link has a long service life. The wear part 2 comprises terminal wear stays at the end areas 35, 36 and a central wear stay at the projection 19. The projection 19 that projects past the lateral surfaces 6, 7 of the link is provided on the wear face 18 approximately at half the length of the link. The projection 19 has at half the length of the link its greatest width and tapers in the direction to its outer sides 20, 21. The outer sides 20, 21 are across part of their height of a planar configuration and then pass with a continuous curvature into the topside 22 of the projection 19 (FIG. 3). The topside 22, like tire contact surface 3, is advantageously shaped like a pitched roof and has two surface portions 23, 24 that are positioned at an obtuse angle to one another and that converge toward one another and meet at half the width of the link. The projection 19 is positioned, in a side view according to FIG. 1, approximately at the level of the divider stay 12. The bottom sides 25, 26 of the sections of the projection 19 projecting past the lateral surfaces 6, 7 converge with the outer sides 20, 21 (FIG. 3). The outer sides 20, 21 are positioned parallel to one another (FIG. 2) and pass with a concave curvature into the lateral surfaces 6, 7 of the link. According to FIG. 2 the lateral surfaces 6, 7 pass with a curvature into one another at both ends of the link. In this way, the ends of the link have a tapering cross-sectional shape.

Recesses 27, 28 are provided in the outer sides 20, 21 of the projection 19, respectively. As shown in FIGS. 1 and 4 for the recess 28, the recesses are open in the downward direction toward the bottom sides 25,26. The recesses 27, 28 extend across the entire height of the planar outer sides 20, 21 up to the curved transition by means of which transition the planar outer sides 20, 21 pass into the topside 22 of the projection 19. The recesses 27, 28 have a part-circular contour, especially a semi-circular contour. The recesses 27, 28, as shown in FIG. 3, extend up to the level of lateral surface 6, 7 of the link. The recesses 27, 28 are positioned on an imaginary extension of the divider stay 12.

The projection 19 has lateral surfaces 29, 30 (FIG. 2) that extend across the link with a convex curvature and have a transition into the bottom 31, 32 of the recesses 33, 34. They separate the centrally arranged projection 19 from the end areas 35, 36 of the link. The end areas 35, 36 have across the width of the link a part-circular curved topside 37, 38, respectively. The topsides 37, 38 pass, in a side view according to FIG. 1, with a continuous curvature into the end faces 39, 40 of the link that, in turn, pass with an arc-shaped curvature into the tire contact surface 3.

Figure 2:
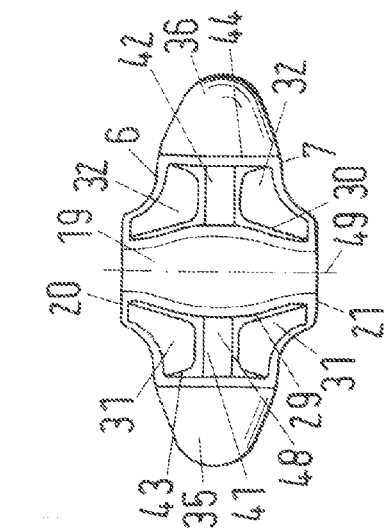
FIG. 2 is a plan view of the link according to FIG. 1.
Figure 5:
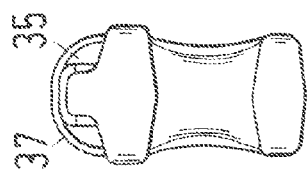
FIG. 5 is a section along the section line V-V in FIG. 1.

At half the width of the link in the recesses 33, 34 there is a longitudinal stay 41, 42, respectively, that extends at half the width of the recesses 33, 34 in the longitudinal direction of the link (FIG. 2). The longitudinal stays 41, 42 connect the lateral surfaces 29, 30 of the central projection 19 with the opposed lateral surfaces 43, 44 of the end areas 35, 36 with terminal wear stays. The longitudinal stays 41, 42 are lower than the central projection 19 and the end areas 35, 36.

The end areas 35, 36 are provided at their outer sides with recesses 45 to 47, respectively. These recesses 45, 46, 47 (45 is opposite 46 and is shown in FIG. 3; of course, recess 47 has a counterpart on the opposite side that is not visible in the illustrated views) have a round contour. The recesses 45 to 47 are positioned approximately at the level of the bottom 31, 32 of the recesses 33, 34.

The longitudinal stays 41, 42 extending in the longitudinal direction of the link form directional stays that lead to additional stability in the running behavior of the tire chain provided with the links according to the invention.

The link is symmetric to a longitudinal center plane 48 and a transverse center plane 49 (FIG. 2). In this way, assembling a tire chain with the links and the ring members 13 is made simple.

The link when in use first engages the ground with the end areas 35, 36 and the projection 19. Because of the recesses 33, 34, edges are formed at the transitions from the projection 19 (central wear stay) and the end areas (terminal wear stays) 35, 36 into the recesses 33, 34 which edges provide excellent grip. Since the central projection 19 projects laterally past the lateral surfaces 6,7 of the link, in the area of the wear face a large contact width results that leads to increased stability against tilting of the link. As a result of the high tilting stability, the risk that a bending force will act on the ring members 13 coupled to the links is also reduced. In this way, the ring members 13 are also protected from breakage as a result of high loads caused by the links. The widened projection 19 in connection with the described excellent grip provides excellent running behavior of the tire chain in use.

With increasing wear the end areas 35, 36 and the projection 19 are worn off and the directional stays 41, 42 come into play in that they provide additional edges because of their width being smaller than the width of the link. With increasing wear, the grip and directional stability of the link are therefore not reduced. With increasing time of use, the link in the area of its wear part 2 is worn such that the recesses 27, 28; 45 to 47 come into play. The material of the link is worn off to the level of the recesses so that additional edges are formed again that, even for greater wear of the link, provide a high grip. In this way, the link can remain in use until the wear part 2 has been almost completely worn off.

This longitudinal stays 41, 42 that are located within the recesses 33, 34 form additional hardened edges when the wear part 2 has been worn off to the level of the longitudinal stays. The link is hardened at least in the area of the wear part 2 so that for a corresponding wear of the link the directional stays 41, 42 with their longitudinal edges provide additional hardened edges.

The receiving openings 10, 11 with their boundary walls 50, 51 are formed such that the surface pressure between the walls 50, 51 and the ring member 3 is kept as small as possible. Based on FIG. 6 and FIG. 7 this will be explained in more detail in relation to the receiving opening 11. The wall 51 is designed such that it has two contact surfaces 52, 53 that in cross-section have a part-circular shape. The radius of curvature of the contact surfaces 52, 53 corresponds to the radius of curvature of the inner side 54 of the ring member 13 (FIG. 7). In this way, the two contact surfaces 52, 53 rest areally against the inner side 54 of the ring member 13. In the area between the two contact surfaces 52, 53 the wall 51 is recessed and provided with a recessed wall section 55 that is essentially positioned on a cylinder surface. The recessed wall section 55 is spaced at a distance from the inner side 54 of the ring member 13.

The two contact surfaces 52, 53 are positioned near the transition of the wall 51 into the exterior surfaces of the link. The contact surfaces 52, 53 extend advantageously about the entire circumference of the receiving opening 10, 11. In principle, it is however sufficient when the contact surfaces 52, 53 are provided only over a portion of the wall 51 which portion is in contact with the ring member 13 when the tire chain is in use.

The two contact surfaces 52, 53 provide stabilization of the link and/or of the ring member 13. The wear behavior of the link and/or ring member 13 is optimized. With increasing wear of the contact surfaces 52, 53 the contact width is becoming larger because now also parts of the recessed wall section 55 will come into contact with the inner side 54 of the ring member 13.

Because of the contact surfaces 52, 53 that are spaced apart from one another, a hardened zone 56 of the wall 51 of the link can be used over an extended period of time. In this way, the service life of the link is also increased.

In principle, it is also possible that the wall 51 has three contact surfaces between which a recessed wall section is located, respectively. In this case, the support action of the ring member 13 is also initially not provided across the entire width of the receiving opening 10,11 so that an optimal wear behavior is provided and the stabilization of the chain members is ensured.

FIG. 8 shows a part of a tire chain that is comprised of four links that are connected to one another by a ring member 13, respectively. The links are embodied as described above. In the engagement area of the ring members 13 with the links the support action and stabilization are realized in the way described in connection with FIGS. 6 and 7. Because of the projections 19 the chain member assembly has a high stability with regard to its running behavior. The projections 19 reduce the risk of bending forces acting on the ring members 13 wherein as a result of the described engagement conditions in the receiving openings 10,11 the stabilization is increased and the surface pressure between the ring members 13 and the links is only minimal.

The specification incorporates by reference the entire disclosure of German priority document 10 2007 043 744.9 having a filing date of Sep. 4, 2007.

While specific embodiments of the invention have been shown and described in detail to illustrate the inventive principles, it will be understood that the invention may be embodied otherwise without departing from such principles.

What is claimed is:

1. A chain member assembly for a tire chain, comprising:
   a link having at least one receiving opening delimited by a wall;
   a ring member engaging the receiving opening;
   wherein the wall of the receiving opening has a contact area where the wall of the receiving opening contacts the ring member;
   wherein the contact area has at least two contact surfaces spaced apart from one another;
   wherein the contact area has a recessed wall section positioned between the at least two contact surfaces;
   wherein the ring member has an inner side that rests against the at least two contact surfaces.

2. The chain member assembly according to claim 1, wherein the link has exterior surfaces and the at least two contact surfaces pass with a continuous curvature into the exterior surfaces of the link.

3. The chain member assembly according to claim 1, wherein the recessed wall section forms a cylinder surface.

4. The chain member assembly according to claim 1, wherein, in cross-section of the wall, the recessed wall section has a radius of curvature that is greater than a radius of curvature of the at least two contact surfaces.

5. A link for a chain member assembly according to claim 1, the link comprising:
   a wear part having a wear face provided with terminal wear stays and a central wear stay;
   wherein the wear part has recesses that separate the terminal wear stays and the central wear stay from one another;
   wherein at least one of the recesses is provided with a longitudinal stay that extends in a longitudinal direction of the link.

6. The link according to claim 5, wherein the longitudinal stay extends between one of the terminal wear stays and the central wear stay.

7. The link according to claim 5, wherein a width of the longitudinal stay is smaller than a width of the recesses.

8. The link according to claim 5, wherein a height of the longitudinal stay is smaller than a height of the terminal wear stays and a height of the central wear stay.

9. The link according to claim 5, wherein the longitudinal stay has a rectangular cross-section.

10. The link according to claim 5, wherein at least one of the terminal wear stays and the central wear stay has outer sides provided with a recess, respectively.

11. The link according to claim 5, wherein the terminal wear stays and the central wear stay each have outer sides provided with a recess, respectively.

12. The link according to claim 5, wherein the central wear stay projects past lateral surfaces of the link so that a contact width of the wear face is enlarged.

13. The link according to claim 5, wherein the central wear stay has a wear face that has the shape of a pitched roof.

14. The link according to claim 5, wherein the central wear stay has outer sides provided with a recess, respectively, wherein the recesses are open in a direction of a tire contact side of the link.

15. The link according to claim 14, wherein the tire contact side has a pitched roof shape.

16. The link according to claim 5, wherein the link is mirror-symmetrical to a longitudinal center plane of the link.

17. The link according to claim 5, wherein the link is mirror-symmetrical to a transverse center plane of the link.

18. A link for a chain member assembly according to claim 1, the link comprising;
   a wear part having a wear face provided with terminal wear stays and a central wear stay;
   wherein the wear part has recesses separating the terminal wear stays and the central wear stay from one another;
   wherein the central wear stay projects past lateral surfaces of the link so that a contact width of the wear face is enlarged.

* * * * *